June 15, 1971    F. VOGES    3,584,400
FOLDABLE POLYHEDRONS
Filed Sept. 16, 1968    3 Sheets-Sheet 1
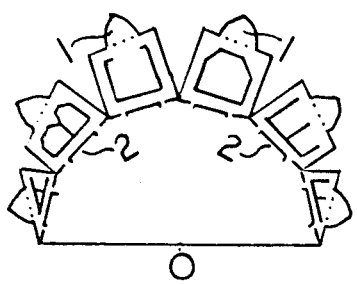
FIG.1
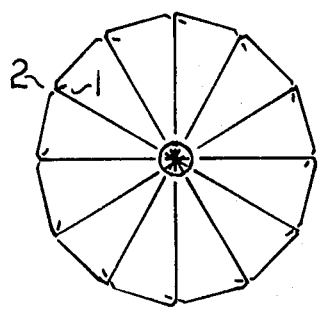
FIG.2
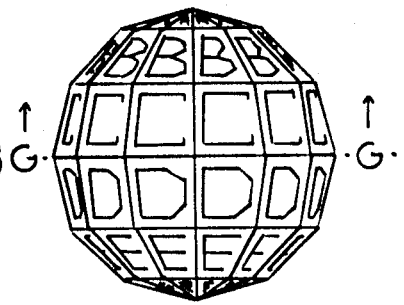
FIG.3
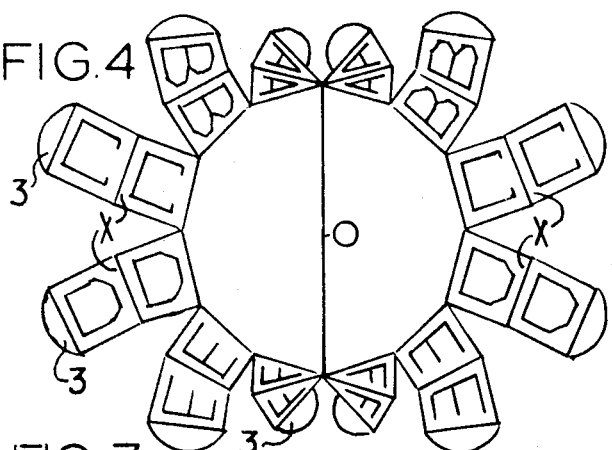
FIG.4
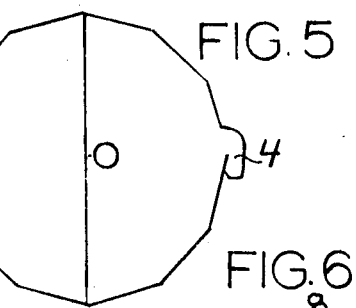
FIG.5
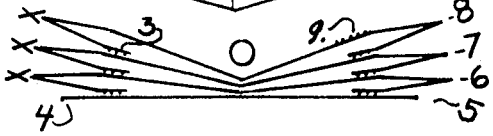
FIG.6
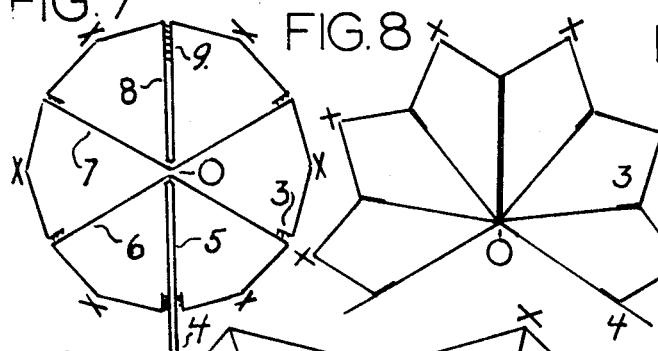
FIG.7  FIG.8
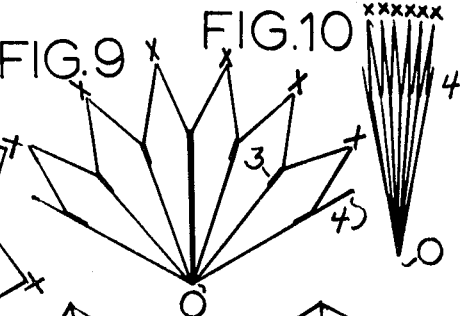
FIG.9  FIG.10
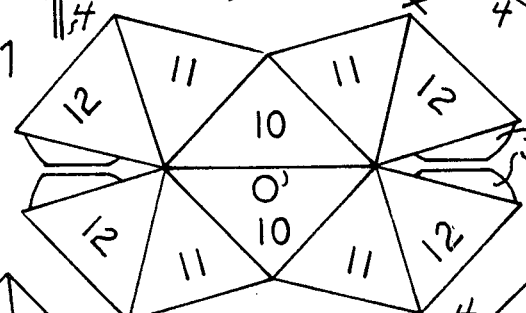
FIG.11
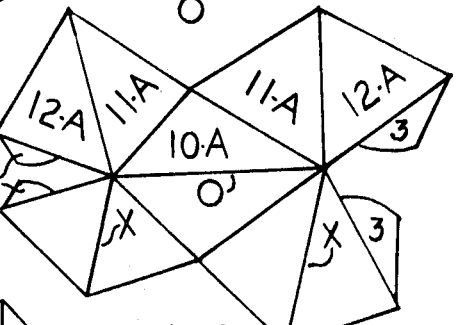
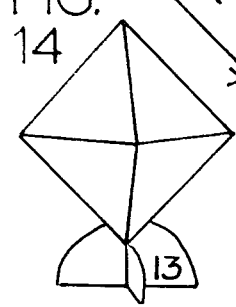
FIG.14
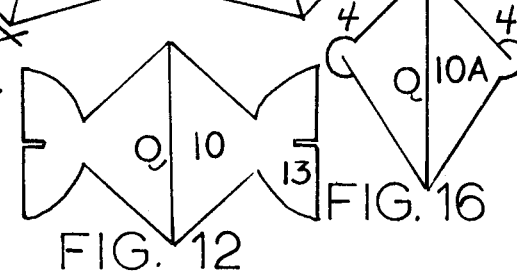
FIG.12  FIG.16
FIG.13  FIG.15
Inventor
Frederick Voges June 15, 1971 F. VOGES 3,584,400
FOLDABLE POLYHEDRONS
Filed Sept. 16, 1968 3 Sheets-Sheet 2
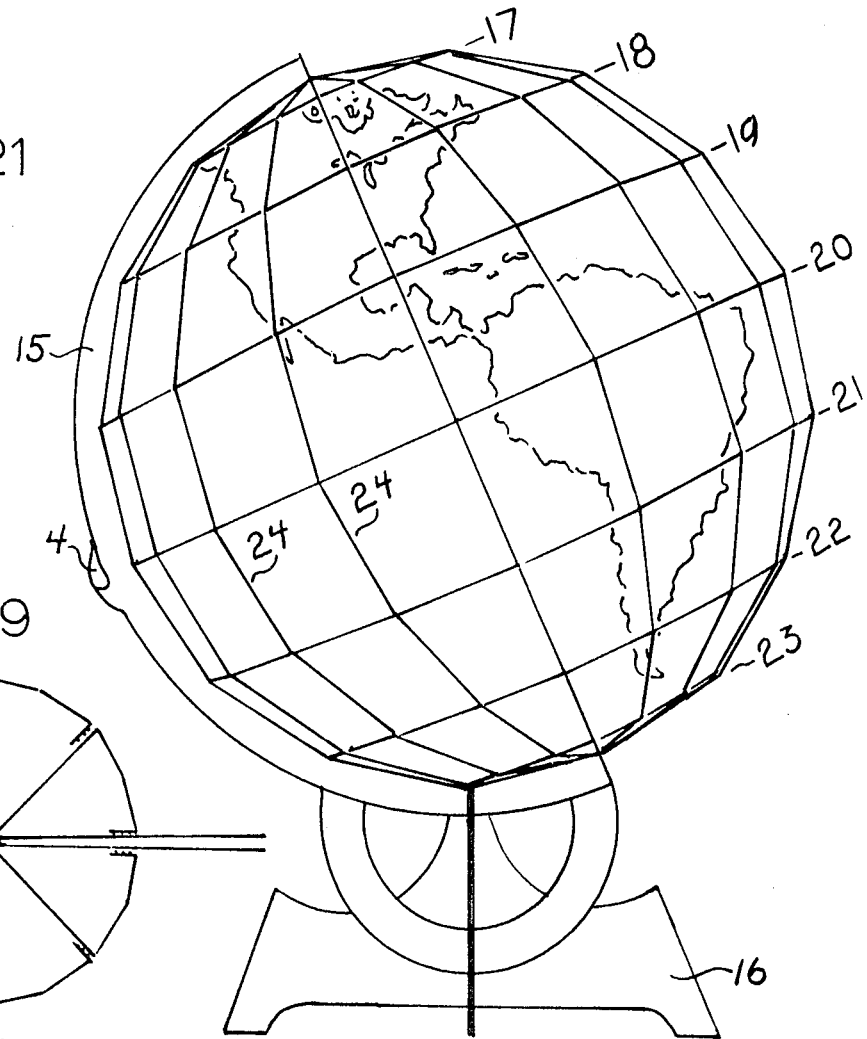
FIG.21
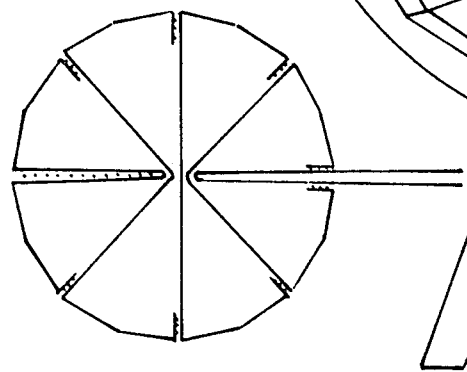
FIG.19
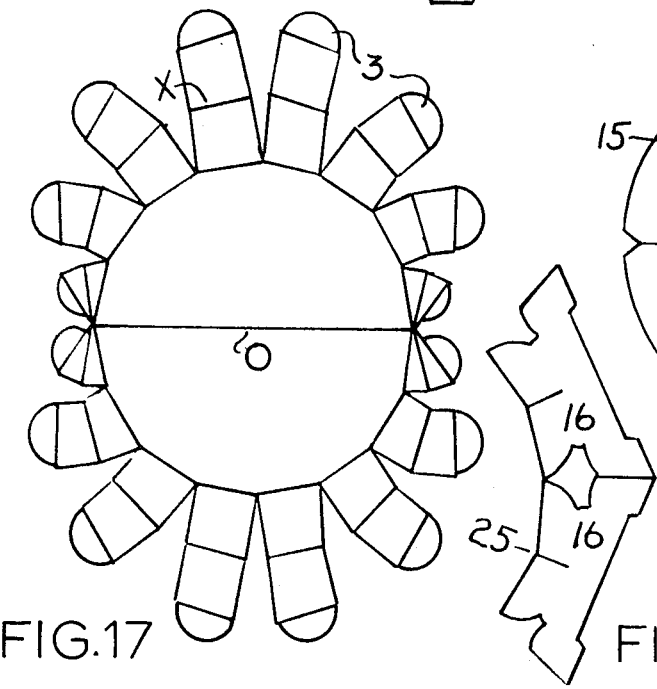
FIG.17
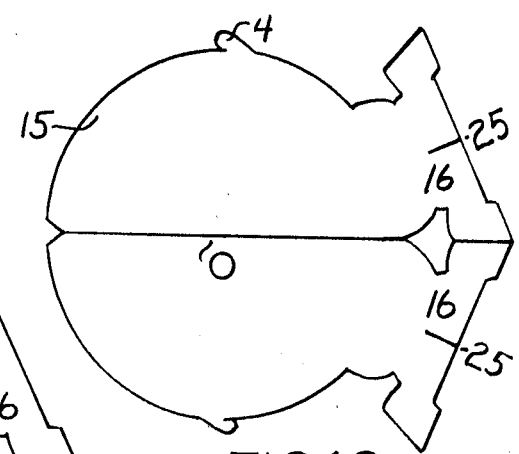
FIG.18
FIG.20
Inventor
Frederick Voges

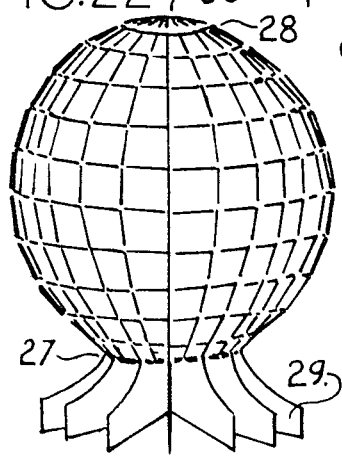
FIG.22
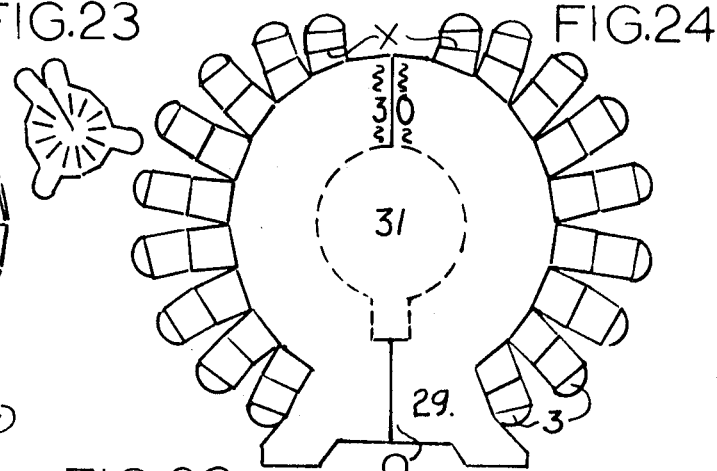
FIG.24
FIG.25
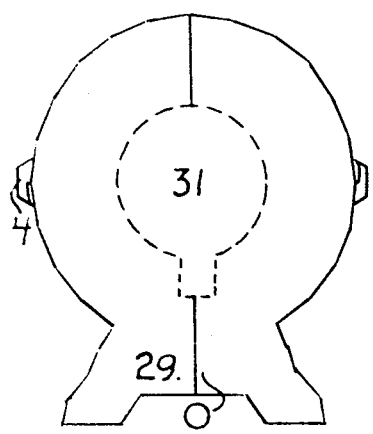
FIG.26
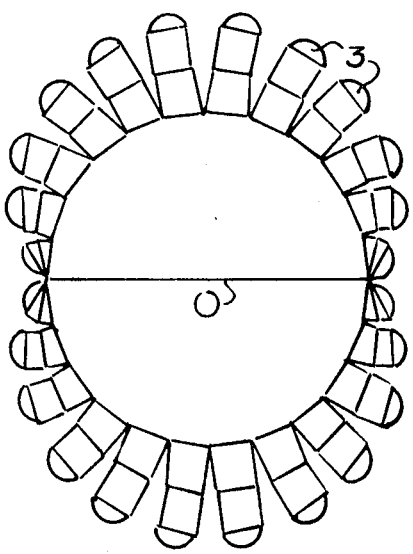
FIG.27
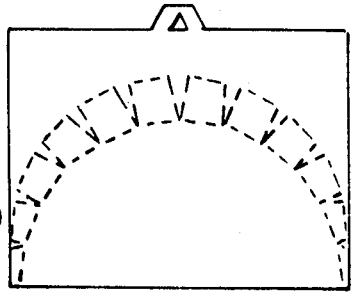
FIG.28
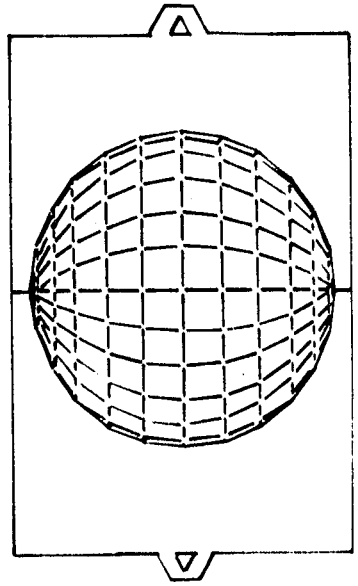
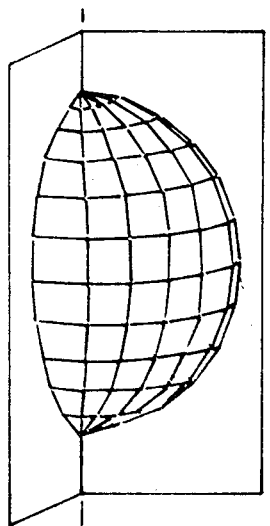
FIG.30
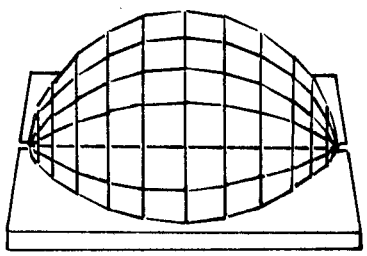
FIG.29
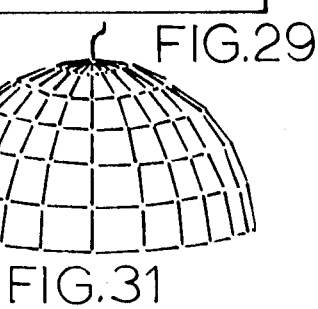
FIG.31
Inventor
Frederick Voges

United States Patent Office 3,584,400
Patented June 15, 1971

3,584,400
FOLDABLE POLYHEDRONS
Frederick Voges, 733 S. Courtland,
Park Ridge, Ill. 60068
Filed Sept. 16, 1968, Ser. No. 759,890
Int. Cl. G09b 27/08
U.S. Cl. 35—46    5 Claims

ABSTRACT OF THE DISCLOSURE

Foldable polyhedrons of the globular type used to represent terrestrial or lunar spheres, blanks for forming these structures and methods for assembling the blanks are disclosed. The assemblage of the die cut blanks result in a foldable inner skeletal section formed of planar panels radiating from a central axis line and extending to the meridian lines of the globe's surface and an outer surface shell composed of abutting, conjugate facets that are secured to the perimetric edge of the adjacent skeletal panel.

---

The education of our children has been described by the President of the United States as "our country's most worthwhile endeavor." Knowledge and understanding of the people of our world, their nations and the relationships of these lands to one another is a basic tool of that education. Flat maps with all of their inherent distortion can only serve to illustrate the geographical details of a small segment on the earth with accuracy. They cannot truthfully and realistically put into proper perspective the relationships of continents, oceans and hemispheres. Only a three dimensional globe can accomplish this. The terrestrial globe of the schoolroom, however, is unwieldy, bulky and expensive, totally unsuitable for carrying between home and classroom by the student, for protracted personal study. Albrecht Durer suggested the solution over four hundred years ago, a foldable polyhedron map.

For the past century, American inventors, recognizing this need, have come forward with various solutions to this problem with varying degrees of success. None proved sufficiently successful to gain a foothold in today's realistic markets. Plainly certain new and useful improvements are required to make this hoped for eventuality take place.

It is the primary object of the present invention to provide a faceted globe with sufficient multiplicity of planar surfaces to closely approach a true globe in appearance and accuracy of geographical details, which can be manufactured efficiently and economically, stored in a minimum of space, shipped at a fraction of the cost of standard rigid globes and be so constructed that it can be unfolded in two seconds into a globular shaped polyhedron and, after being used, can be folded again with similar rapidity to a flat form occupying less than 2 percent of its expanded size, and which in its preferred embodiment, would require no assembly.

In checking prior art from the 1860's to the 1960's, we find "Folding Globes" of the past were compressed by means of a complex inner framework of metal ribs, sliding rods and rotating disks within a pliable outer covering. The present invention ingeniously combines a foldable inner framework with a foldable outer covering which fold in unison and are made of the same material, preferably paper stock, but conceivably metal or plastic sheeting.

Prior art depicts fourteen sided structures and twenty sided icosahedrals. This paucity of facets results in an angular rather than a globular figure and the resultant squares, octagons and equilateral triangles have edges that run across rather than with the conventional delineating marks of latitudes and longitudes of the terrestrial globe. The present invention's facets are bounded by regulation latitudes and meridians and are not restricted to any specific number. Four sheets of paper properly printed and processed can produce a seventy-two faceted sphere for the grade school pupil, each facet representing an area 30° latitudinally by 30° longitudinally. For a junior high student using seven sheets would give him a two hundred and eighty faceted sphere, each facet 15° by 15°. For a high school student's globe ten sheets would produce six hundred and forty-eight 10° by 10° facets.

Other objects and features of novelty of the invention will be made apparent by the following description and the accompanying drawings which, it will be understood, are only illustrative of the invention and impose no limitations thereon not imposed by the appended claims. In the drawing, forming part of this application, in which similar reference numerals or letters refer to like parts:

FIG. 1 is a plan view of a die cut blank, twelve of which, properly assembled will form a rigid seventy-two faceted polyhedron.

FIG. 2 is an equatorial cross-sectional view of those twelve blanks properly assembled; taken from line G—G of FIG. 3.

FIG. 3 is an elevational view of a completed polyhedron with seventy-two facets.

FIG. 4 is a plan view of a full circle die cut blank, of which three and an additional cover blank, properly assembled, will form a seventy-two faceted polyhedron which can be folded and unfolded at will.

FIG. 5 is a plan view of the cover blank.

FIG. 6 is a sectional view of these four blanks properly collated.

FIG. 7 is a cross-sectional view of the fully extended polyhedron taken from line G—G of FIG. 3.

FIG. 8 is a view corresponding to FIG. 7 showing the polyhedron in process of being folded together.

FIG. 9 is a view corresponding to FIG. 7 showing the polyhedron in succeeding stage of compression.

FIG. 10 is a view corresponding to FIG. 7 showing the polyhedron completely folded together.

FIG. 11 is a plan view of a die cut blank so designed as to form a foldable octahedron.

FIG. 12 is a plan view of the cover blank used in conjunction with die cut blank shown in FIG. 11.

FIG. 13 is a plan view of locking piece which will hold octahedron in expanded position and simultaneously serve as a component section of the base.

FIG. 14 is an elevational view of the expanded octahedron with locking piece in place.

FIG. 15 is a plan view of die cut blank so designed as to form a foldable asymmetrical octahedron.

FIG. 16 is a plan view of the cover blank used in conjunction with die cut blank shown in FIG. 15.

FIG. 17 is a plan view of a die cut blank of which four and a cover blank, properly assembled, will form a foldable one hundred and twenty-eight faceted polyhedron which could be utilized as a terrestrial globe.

FIG. 18 is a plan view of matching cover blank so designed as to include a semi-meridian ring and base.

FIG. 19 is an equatorial cross-sectional view of these five blanks properly assembled.

FIG. 20 is a plan view of the slotted base component.

FIG. 21 is an elevational view of the polyhedron tilted 23½° and showing a typical portion of the world map on its faceted surface.

FIG. 22 is an elevational view of the expanded polyhedron showing disk properly mounted on polyhedron.

FIG. 24 is a plan view of a die cut blank of which six and a cover blank, properly assembled, will form a foldable two hundred and eighty-eight faceted polyhedron with a built in base. Dotted lines show optional light bulb chamber for interior illumination.

FIG. 25 is a plan view of matching cover blank used in conjunction with die cut blank shown in FIG. 24.

FIG. 26 is a plan view of a die cut blank similar to the one depicted in FIG. 24 but without built in base and designed to form a merihedric structure.

FIG. 27 is a perspective view of folded rectangular blank containing three die cut blanks properly assembled and folded accordian-like within. Dotted lines show their position.

FIG. 28 is an elevational view of the composite structure shown in FIG. 27 unfolded forming a hemisphere of one hundred and forty-four facets, suitable as a three dimensional wall map.

FIG. 29 is an elevational view of the structure shown in FIG. 27 unfolded forming a hemisphere suitable for study or reference on a desk or table.

FIG. 30 is an elevational view of a half section of FIG. 27 being used as a three dimensional wall map in a corner of a schoolroom.

FIG. 31 is an elevational view of a hemispheric structure bisected at the equatorial parallel suitable for use as an ornamental lamp shade.

Figure 23:
FIG. 23 is a plan view of die cut disk so constructed as to fit onto polyhedron opposite base and inscribed to designate the twenty-four hours of the day.

It will be noticed that the appended drawings depict several examples of foldable polyhedrons rather than one. This is done to clearly and concisely demonstrate to anyone practiced in the art the precise steps to be taken in planning, preparing and manufacturing these units.

The geometric figure best suited for this process is the symmetrical globular type, consisting of an inner skeletal section formed of planar panels radiating from a central axis line and extending to the meridian lines of the globe's surface and an outer surface shell composed of planar facets connected to the outer edges of the skeletal panels and to the adjacent facets on either side of them which are positioned in the same latitude. These facets would abut but not be physically connected to the adjacent facets above and below them which are positioned between the same meridian lines. The number and proportions of the facets forming the surface shell would be determined by the number of meridional, longitudinal great circles passing through the poles of the globe and the latitudinal lesser circles, paralleling the equator, crossing them.

The greater the number of these dividers, the greater the number of facets and the more spherical in shape the polyhedron. The lesser the number of these dividers, the lesser the number of facets and the greater the angularity of the polyhedron.

In the simplest form of this type of unit, the octahedron, two longitudinal great circles pass through the poles positioned at a 90° angle to one another, and the equatorial latitude encircles the figure midway between the poles. This results in a figure having eight facets. If the number of these meridional great circles were increased to seventy-two and the parallels to seventy-one the sum total of surface facets would increase to ten thousand, three hundred sixty-eight. Between these two extremes are thousands of symmetrical and asymmetrical polyhedrons.

First decide which particular one of these polyhedrons is the most suitable for your purpose. Then lay out a cross section of that polyhedron, bisected along the lines of one of the meridional great circles. In a symmetrical octahedron this will result in a square with the axis running diagonally from one corner to the opposite corner. In an eighteen faceted polyhedron the cross section would be hexagonally shaped. A thirty-two faceted polyhedron would be octagonally shaped.

A seventy-two sided polyhedron bisected through one of its meridional lines would produce a duodecagon, the axis line running diagonally between opposite points dividing it into two rough semi-circles. FIG. 1 of the appended drawings depicts one of these semi-circular panels bounded by the axis line o on one side, and the regular six sided edge of this particular figure on the opposite side. The completed figure would be formed of twelve of these panels hinged at the axis edges to one another forming the inner skeletal section, and each having six facets A, B, C, D, E, and F hingedly connected to the six short perimetric lines, which would form the longitudinal base lines of these facets. The facets preferably would be integral extensions of their panels and would, when the figure was expanded, form the outer surface shell of the polyhedron.

All of the facets would have similar longitudinal dimensions, one twelfth of the great circle meridian. The widths would vary according to their position in relationship to the lesser circle parallels of the polyhedron. Thus facets A and F would be triangular, having no width where they touch the poles. The bases of these triangles would be one twelfth of the sixtieth parallel, which they touch, as would the top of facet B and the bottom of facet E. The tops of facets C and E and the bottoms of facets B and D would be one twelfth of the thirtieth parallel in width. The width of facets C and D at their point of juncture at the equator would be one twelfth of its length.

Die cut lock tabs 1—1 on outer edges of facets and die cut slots 2—2 on inner edges of facets will be used to lock polyhedrons together as shown in sectional view, FIG. 2. The twelve skeletal panels will be hinged along axis line o by the most appropriate means; rings, stitches, adhesives, wire or lock tabs, depending on material used, degree of durability desired and end use planned for product. Rings are shown in FIG. 2.

With twelve skeletal sections hinged at axis edges unit now can be opened, booklike, and each section locked into position 30° angularly inclined from its neighbor by inserting the six tabs 1—1 on one section into the six corresponding slots 2—2 in the adjoining section. Upon completion of tab insertion, unit is formed into a rigid seventy-two faceted polyhedron, FIG. 3. It can be suspended by a cord for examination by rotation, or placed on a simple base.

A terrestrial globe made in this free form would be of special convenience for studying the antarctic area or, laid on its side and rotated, the flying path of the United States Astronauts. This simplest and cheapest construction of a folding polyhedron is ideal for a do-it-yourself project for younger children. It could be made of die cut panels hingedly connected at the axis line and printed in one color suitable for coloring by the child. Because it is not glued together at the faceted edges the inner panels could be used for a detailed description of the geographic areas depicted on the faceted area. The assembling could serve to develop manual dexterity, pride in achievement and a greater knowledge of the relationship of the indicated geographical details on each succeeding panel. These are its advantages.

It has, however, disadvantages when directed at an older age group. It will be noticed that this unit's foldability is restricted to the inner skeletal structure and that it requires twelve separate sheets. The assembly entails the insertion of seventy-two tabs into their respective slots. To simplify this operation we can reduce the number of blanks needed to six by using the full circle blank, FIG. 4, and folding it along the axis line o. Then we can double the facets on each blank and reduce the six sheets to three. The facets would be in the form of foldable conjugate pairs, B and B, C and C, etc., FIG. 4. Thus by adding a foldable outer, faceted surface structure to the foldable inner, skeletal structure, we arrive at a completely foldable polyhedron, FIG. 3.

The added tabs, 3—3, on the outer facets will be permanently secured, preferably by adhesives, to the adjacent sheet. It is understood that they could be stitched, tabbed in or otherwise secured, if so suggested by altered circumstances. The hinged sections of the assembled structure can now be opened or closed like pages of a book.

Still required is a means to open and close them similar to a book cover, and means to lock this cover into an open position holding the formed polyhedron in its expanded shape. To accomplish this we add a cover panel, FIG. 5, to the assembly, which is shaped similarly to the facet bearing panel, but without the conjugate facets, and with the addition of locking means, 4 and 4.

FIG. 6 depicts proper assembly of the three faceted blanks and the cover blank. Cover blank 5 is placed, printed side down, on flat surface. Faceted blanks 6, 7, and 8, printed side up, are positioned above it one upon another in stack form. The outer facets should be folded downward on fold line x and the tabs 3—3 extending from the outer facets glued to the skeletal panel beneath. Dotted lines signify adhesive. Blanks are joined along axis line o—o preferably by stitching. Uppermost faceted blank 8 is folded together on axis line o—o and main panels glued together at position 9. This is done to enable globe to be formed of sheets printed on one side only, reducing costs.

The same procedure of collation should be followed in assembling other polyhedrons whose facets are bounded by longitudinal and latitudinal lines. Cover blank 5 ideally should close along 180° date line meridian running through central portion of Pacific Ocean, which is relatively free of land masses.

FIG. 7 shows sectional view, taken from line G—G of FIG. 3, of assembled polyhedron in unfolded, expanded form. Stitched or glued unions as #9 are shown slightly separated to allow correct identification of individual blanks. FIGS. 7, 8, 9, and 10 show polyhedron in succeeding stages of compression, from unfolded globe, FIG. 7 to completely closed, flattened form, FIG. 10.

The simplest polyhedron whose facets are bounded by longitudinal and latitudinal lines is the octahedron. This eight-sided figure can be made by combining one facet bearing panel, FIG. 11, and one cover blank, FIG. 12. The inner skeletal panel 10 is square with the axis o bisecting it diagonally. On each of the four side facet 11 should be laid out. As one corner of the facets touch a pole or terminal point of the axis the facets should be triangles because another corner of the triangular facet touches the equatorial line, its base width will be the same as its longitudinal length. The triangles therefor will be equilateral. These conclusions would not necessarily apply in laying out asymmetrical octahedrons.

Now from each of the four original facets project a conjugate facet 12 hingedly connected to it; and on the outer edge of this outer facet a hinged tab 3 to be adhesively, or otherwise, secured to the cover blank. FIG. 12 is the cover blank with a similar square skeletal panel 10 hinged, preferably by folding, along the axial line o and without facets, but with the addition of an integral base 13. The base area is slotted to accommodate a locking section, FIG. 13, which acts as the completion of the base assembly 13 simultaneously locking the polyhedron in an expanded position, FIG. 14.

FIG. 15 shows layout for asymmetrical octahedron. Cover panel, FIG. 16 would be same as central skeletal panel 10–A of FIG. 15; and assembling procedure would be similar to one used with FIGS. 11 and 12.

FIGS. 17 through 21 show variations of terrestrial globes by extension; extending marginal edges of cover blank, FIG. 18, to form semimeridian ring 15 and base section 16. To achieve a more globular shape than the seventy-two faceted polyhedron shown in FIG. 3, an extra facet bearing blank, FIG. 17, has been added, which increases this type of blank used in FIG. 19 to four, and the total facets to one hundred and twenty-eight; each one representing an area of the globe 22½° longitudinally by 22½° latitudinally. This construction is ideally suited for grade school students, as the seven parallels fall within a degree or less of the Arctic Circle 17, the midway mark of the northern temperate zone 18, the Tropic of Cancer 19, the equator 20, the Tropic of Capricorn 21, the midway mark of the southern temperate zone 22 and the Antiarctic Circle 23, thus dividing the globe into eight climatic zones. These zones are: the two frigid zones, and two sections each of the north temperate zone; the torrid zone and the south temperate zone. The eight meridians 24 would divide the globe into two hemispheres and each hemisphere, longitudinally, into halves and quarters.

The base area of cover blank, FIG. 18, is slotted 25 to accommodate slotted section, FIG. 20, which acts as the completion of the base assembly 16. Means for locking the polyhedron in an expanded position are provided for on the semi-meridian ring 15. This could be accomplished by various methods including hooks, clips, snaps, buttons, ties, loops, pins, clamps or die cut lock tabs out of the ring itself 15. We choose to illustrate the lock tabs 4 in FIG. 18. Other circumstances could dictate another choice.

The base 16 is constructed off center to demonstrate the earth's natural 23½° inclination to complement the other climatic features of this globe. FIG. 21 shows the polyhedron with typical portion of a world map on its faceted surface.

FIGS. 22 through 25 show variations of foldable polyhedrons by omission, resulting in merihedric structures: polyhedrons having less than the full complement of facets, constructed however in the conventional fashion. FIG. 22 shows a polyhedron of this type formed of six die cut blanks and a cover blank. Its surface area, divided by meridians spaced 15° apart and parallels 15° apart, normally would have two hundred and eighty-eight facets. However in this specific example we have eliminated the forty-eight facets positioned south of the sixtieth parallel 27 and the twenty-four facets north of the seventy-fifth parallel 28. The former to utilize this portion of the sheet assembly to construct a base 29, and the latter to form a vent 30, in case optional light bulb chamber 31 is used. This now gives us a figure with two hundred and sixteen facets and a separate polar disk FIG. 23 acting as a world clock of twenty-four hours, which conveniently fits over vent exit 30 when bulb is not being used. The center portion 31 of skeletal panel FIG. 24 has been removed for optional insertion of light bulb.

FIG. 22 depicts ideal globe for upper class studies in grade schools. Each of the twenty-four longitudinal divisions represents one hour of the world clock. For approximate distances the latitudinal lines are roughly one thousand miles apart, as are the meridians at the equatorial position. With over two hundred facets it takes on a spherical shape and reduces distortion of map detail to a negligible minimum. It is constructed with a self base 29 and is provided with facilities for interior illumination 31, including vented area 30. Means for locking in expanded state are incorporated into cover blank, FIG. 25, which carries numerals showing degrees of latitude.

Other merihedric examples are shown in FIGS. 26 through 31. By omitting one-half of the six facet bearing blanks, FIG. 26, a foldable hemisphere is formed, FIG. 28. This would be ideal for a lunar globe and would be suitable for hanging on a wall, FIG. 27, closed; FIG. 28, expanded. It could be included singly, or in a series, in the make-up of an Atlas, FIG. 29. In like fashion, if three quarters of the blanks were omitted a half hemisphere, FIG. 30, showing one quarter of the earth's surface, North and South America or Europe and Africa could be shown for specialized study. This three dimensional, true proportioned wall map could be located in the corner of a schoolroom, folding flat against the wall when not in use.

By omitting the southern portion of a full round polyhedron, below the equator, a different type of hemisphere can be produced, FIG. 31, which could be used as a lampshade. While the invention's preferred embodiment is a terrestrial globe, it will be understood that the construction also lends itself to other diverse embodiments without departing from the scope of the claims.

From the foregoing it will thus be seen that this invention will provide a faceted globe with sufficient multiplicity of facets to closely approach a true globe in appearance and accuracy of geographical details, which can be manufactured efficiently and economically, stored in a minimum of space, shipped at a fraction of the cost of standard rigid globes and be capable of being folded or unfolded in a matter of seconds and which, in its preferred embodiment, would require no assembly. In short, it can put the knowledge of the earth into the hands of all American school children.

Having thus described my invention, what I claim and desire to secure by Letters Patent is:

1. A collapsible and expandable polyhedron comprising an inner skeletal supporting framework formed of a plurality of generally semicircular planar members hingedly connected together along the substantially straight edge thereof for relative rotative movement about a common axis between a closed position where said members are in superimposed relation, and an open position where said members extend radially outwardly from said common axis in angularly spaced relation, the outer edge of each said member being substantially semicircular and the ends thereof, at the intersection with said common axis, defining the north and south poles of a globe, a plurality of adjacent tabs extending outwardly from and hingedly connected to the outer edge of each of said members, the tabs above and below a line defining the equator of the globe being of substantially trapezoidal shape with the shorter base thereof located on the side closer to the nearest pole and having a transverse fold line intermediate the ends thereof, thereby providing a plurality of facets, means hingedly securing the outer end of each said tab to an adjacent one of said members, whereby movement of said members to closed position will cause the tabs to collapse and fold the facets of each tab outwardly to a position in substantial face to face contact with each other, and movement of said members to open position will unfold said tabs, by moving the fold line thereof inwardly, the base of each tab closer to the nearest pole progressively diminishing in length and the endmost tabs being substantially triangular, whereby said tabs in unfolded condition will provide a multiplicity of abutting facets forming a substantially continuous spherically shaped surface covering said framework.

2. The combination of elements defined in claim 1, wherein there are at least six of said planar members.

3. The combination of elements defined in claim 1, including at least one additional planar member, the radius of the outer edge thereof being greater than that of the other said planar members, and support means on said additional planar members forming a base for said polyhedron in its expanded condition.

4. The combination of elements defined in claim 1, including map indicia on said spherically shaped surface.

5. The combination of elements defined in claim 1, and means for locking said polyhedron in its expanded condition.

References Cited

UNITED STATES PATENTS

| | | | |
|---|---|---|---|
| 518,067 | 4/1894 | Kerr | 46—30 |
| 753,781 | 3/1904 | Wundsch et al. | 161—17 |
| 1,545,750 | 7/1925 | Fleming | 161—16X |
| 2,108,349 | 2/1938 | Rasmussen | 40—126A |
| 2,183,443 | 12/1939 | Bracker | 46—12 |
| 2,393,676 | 1/1946 | Fuller | 35—46A |
| 2,436,860 | 2/1948 | Fisher | 35—46A |
| 2,546,878 | 3/1951 | Towncey | 40—126AX |

FOREIGN PATENTS

| | | | |
|---|---|---|---|
| 495,153 | 11/1938 | Great Britain | 40—102 |

JEROME SCHNALL, Primary Examiner

U.S. Cl. X.R.

46—17; 161—17